US009836769B1

(12) United States Patent
Murray et al.

(10) Patent No.: US 9,836,769 B1
(45) Date of Patent: Dec. 5, 2017

(54) DETERMINING BIDS FOR TELEVISION ADVERTISEMENT AUCTIONS

(75) Inventors: Robert Murray, Irvine, CA (US); Jyotsna Gangwar, San Clemente, CA (US); Bozhena Bidyuk, Westminster, CA (US)

(73) Assignee: Google Inc., Mountain View, CA (US)

( * ) Notice: Subject to any disclaimer, the term of this patent is extended or adjusted under 35 U.S.C. 154(b) by 887 days.

(21) Appl. No.: 13/159,718

(22) Filed: Jun. 14, 2011

(51) Int. Cl.
G06Q 30/00 (2012.01)
G06Q 30/02 (2012.01)

(52) U.S. Cl.
CPC .............................. *G06Q 30/0275* (2013.01)

(58) Field of Classification Search
USPC ....................................................... 705/50–79
See application file for complete search history.

(56) References Cited

U.S. PATENT DOCUMENTS

2008/0052219 A1* 2/2008 Sandholm .............. G06Q 30/08
705/37

2010/0138291 A1* 6/2010 Silverman .............. G06Q 30/02
705/14.45

FOREIGN PATENT DOCUMENTS

JP 2015018536 A * 1/2015

OTHER PUBLICATIONS

Microsoft Advertising TV Network [retrieved on Jun. 14, 2011], http://advertising.microsoft.com/tv. Retrieved from the Internet <URL:http://admira.navic.tv/>, 1 page.

* cited by examiner

*Primary Examiner* — James A Reagan
(74) *Attorney, Agent, or Firm* — Fish & Richardson P.C.

(57) ABSTRACT

Methods, systems and apparatus, including computer programs encoded on a computer storage medium, for generating a target bid for an advertiser to use in an auction directed at enabling the advertiser to reach the advertiser's advertising goal (e.g., a cost-per-call goal) for a particular advertising target (e.g., a television program or demographic) based on the target's historical advertising performance.

19 Claims, 5 Drawing Sheets

DETERMINING BIDS FOR TELEVISION ADVERTISEMENT AUCTIONS

BACKGROUND

This disclosure relates to television advertising.

Television advertisers have many options for airing their advertisements during a television broadcast. For example, an advertiser can purchase airtime (e.g., through an advertisement auction) to direct its advertisement to a specific advertising target(s) (e.g., air the advertisement during a particular television program, on a particular broadcast network, or during a certain time period). The determination of which airtime or advertising target to purchase can greatly influence the effectiveness of the advertisement airing. For example, if the advertiser is advertising an energy recovery supplement then it is likely an advertisement for the supplement airing during a sporting event broadcast will be more effective than that same advertisement airing during a non-sports related program. The effectiveness of an advertisement or an advertising campaign can be measured in myriad ways. For example, one measure of ad effectiveness is a result-per-thousand-impressions metric, such as the number of calls received by the advertiser or an increase in web traffic for the advertiser as a result of one thousand impressions of the ad.

Advertisers sometimes have a cost goal for each advertising target that indicates the acceptable cost to the advertiser to achieve a desired result for an advertising target. For example, the desired result may be a sale of a product or a telephonic inquiry from a consumer. The cost goal can be measured on a per-unit basis, e.g., an advertiser may have a cost-per-call goal for the advertising target.

Many advertisers participate in advertisement auctions through which the advertisers place bids for the opportunity to air their advertisements to or on particular advertising targets. By varying the bid amount an advertiser can alter the likelihood that the advertisement will win the auction for the advertising target. As such, an advertiser may be willing place higher bids for advertising targets that will be more effective at realizing the advertiser's advertising goals (e.g., a specific cost-per-call goal). Unfortunately, it is difficult to translate the advertiser's desired advertising goal for a target into an auction bid to realize that goal.

SUMMARY

In general, one innovative aspect of the subject matter described in this specification can be embodied in methods that include the actions of receiving, from an advertising entity, a desired value specifying an advertising goal of the advertising entity for an advertising target, wherein advertisements of the advertising entity are presented to the advertising targets; and for each of a plurality of advertising targets: receiving attribution data for the advertising target, the attribution data describing a measure of effectiveness of the advertising target in achieving the advertising goal during a first time period; generating an estimated measure of effectiveness of the advertising target during a second time period based on the attribution data, wherein the second time period is after the first time period; and determining a target bid for the advertising target during the second time period based on the desired value and the estimated measure of effectiveness, the target bid representing a predicted cost to achieve the advertising goal of the advertising entity for the advertisement target; and providing the target bid to the advertising entity for use in an auction for the advertising target.

Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. An auction bid directed at realizing an advertiser's advertising goal (e.g., cost-per-call, cost-per conversion) for an advertising target is generated and suggested to the advertiser. The suggested bid is automatically generated thereby saving advertisers from having to manually manage the process, which can be a tedious and time consuming endeavor for advertisers with hundreds of targets or a daunting task for novice advertisers with little experience setting effective bids. The auction bid is based on historical data, and thus is more likely to result in a higher return on investment (ROI) than auction bids that are manually increased solely to increase the number of advertising impressions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

1.0 Overview

The methods and systems described herein can generate a target bid for an advertiser to place in an auction (e.g., a maximum CPM bid). The target bid is calculated to enable the advertiser to reach the advertiser's advertising goal (e.g., a cost-per-call goal) for a particular target based on the target's historical advertising performance (e.g., calls-per-thousand impressions). As used herein, an advertising target is a feature (or features) of an advertising spot that an advertiser has selected as a criterion (or criteria) to place advertisements. An advertising target can be, for example, one or more of a network, program, daypart, network-daypart, or demographic that an advertiser can choose to target their ads. These methods and systems are explained in detail below.

Figure 1:
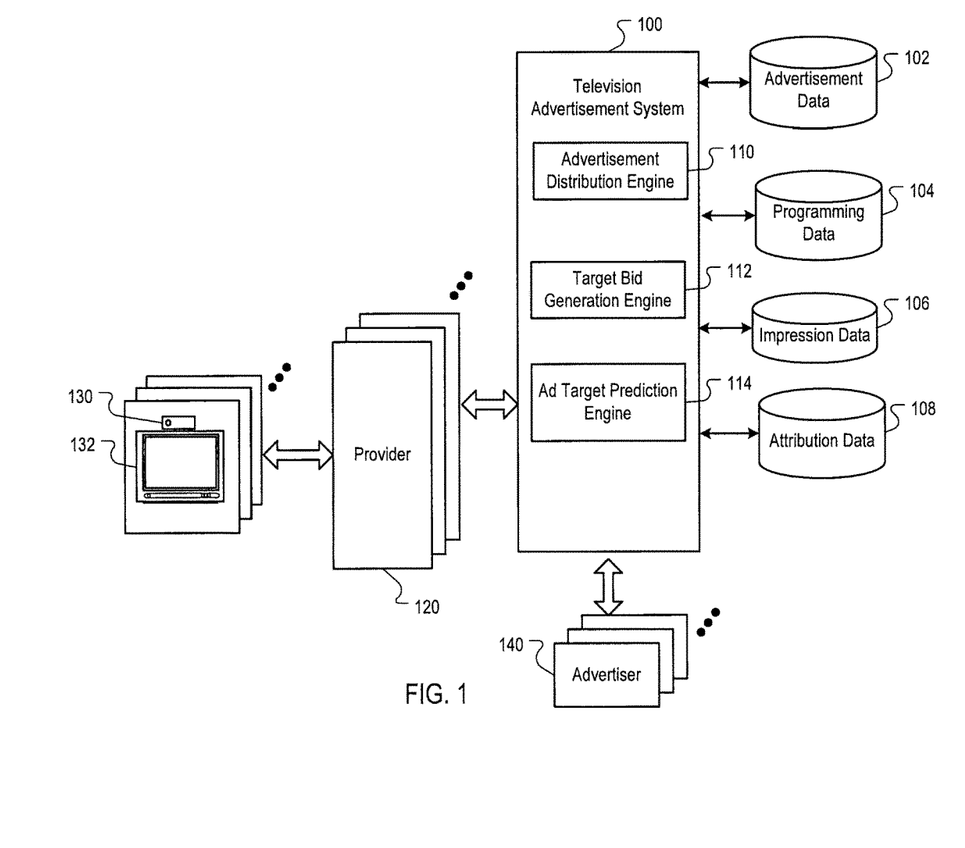
FIG. 1 is a block diagram of an example television advertising system.

FIG. 1 is a block diagram of an example television advertising system 100. The television advertisement system 100 delivers advertising campaign content, e.g., television ads/creatives, to an audience to facilitate operator monetization of programming and quantification of content delivery to target markets. The advertisement can be shown separately from a television program in the form of a television commercial, or can be shown concurrently with a television program in the form of an overlay or text stream on a portion of a television display.

The television advertisement system 100 is typically implemented in computer servers, and can provide and receive data over a network. Example networks include local area networks (LANs), wide area networks (WANs), telephonic networks, and wireless networks. Additionally, the television advertisement system 100 can, for example, communicate over several different types of networks, e.g., the Internet, a satellite network, and a telephonic network.

In general, the television advertisement system 100 receives television advertisements and campaign data from advertisers 140. An advertiser is an entity that provides television advertisements, such as a commercial entity that sells products or services, an advertising agency, or a person. The television advertisement system 100 facilitates the provisioning of television advertisements to television providers 120. A television provider is an entity that facilitates the delivery of a television broadcast (e.g., the programming of a television network) to viewers, such as cable provider, a digital satellite provider, a streaming media provider, or some other media provider.

The television advertisement system 100 also includes one or more data stores to store set top box log data, television advertisements and associated advertisement data. In some implementations, the television advertisement system 100 includes a television advertisement data store 102, a programming data store 104, an impression data store 106, and an attribution data store 108.

The television advertisement data store 102 stores data defining television advertisements that can be broadcast or aired during an advertising target. Example television advertisements include video advertisements, banner advertisements, overlay advertisements, etc. The advertisement data store 102 also includes advertising campaign information for multiple advertisers. An advertising campaign describes an ad or a group of related ads, and conditions for airing the advertisement, such as targeting information for advertising targets, bids, and budgets.

The programming data store 104 stores programming schedules and advertisement avails. The advertisement distribution engine 110 uses the programming schedules and advertisement avails to auction and schedule advertisements.

The impression data store 106 stores, for example, anonymized impression data associated with viewing devices 130. Example viewing devices 130 include set top boxes, digital video recorders and tuners, and other television processing devices that facilitate the viewing of the television signal on a television device. For example, logs related to viewing device 130 activity, e.g., set top box logs, can be anonymized to remove personal information related to viewing activities and provided to the television advertisement system 100. In other implementations, such information can be provided by the provider 120, or by a third party or otherwise obtained by the television advertisement system 100.

Impressions can, for example, be measured statistically. An impression can be a household impression, e.g., the airing of an advertisement in a household and independent of the number of televisions in a household. If the advertisement is presented by use of a viewing device in the household, one household impression can be recorded. Other impression types can also be used. For example, impressions can be generated by a program rating percentage, e.g., a percentage of viewership in measurable households; or by a program share percentage, e.g., a percentage of viewership in active measured homes; or by some other statistical measurement.

By way of another example, impressions can be measured by an analysis of activity logs of the viewing devices 130. For example, a household may have three viewing devices 130, and at a given time two of the devices 130 may be tuned to a first channel and the third device may be tuned to a second channel. If a first advertisement airs on the first channel and a second advertisement airs on the second channel, impressions can be respectively generated for each viewing device 130.

An impression can be dependent on a television channel tune status when an advertisement airs on a channel. For example, an impression can occur when a viewing device 130 is tuned to a broadcast stream in which an advertisement is inserted, and the viewing device 130 remains tuned to the broadcast stream for N consecutive seconds during the actual display time of the insertion. For example, an impression can be defined as a viewing device 130 remaining tuned to a broadcast stream for five seconds after the advertisement begins to air. Alternatively, an impression can be defined as a viewing device 130 tuned to a broadcast stream when an advertisement is airing and remaining tuned to the broadcast stream for five seconds after tuning to the broadcast stream. Other tune times can also be used.

Likewise, other impression types can also be used. For example, an impression can be based on an advertisement exposure, e.g., a brief exposure of an advertisement, or a full viewing of the advertisement, of a threshold viewing in between, e.g., five seconds, or five seconds of the first fifteen seconds; or a percentage of the advertisement viewed, etc.

Advertisers sometimes have a cost goal for each advertising target. The cost goal is an acceptable cost to the advertiser to achieve a desired result for an advertising target. For example, an advertiser may decide that an acceptable cost-per-call resulting from an airing of an advertisement for an advertising target is $1.00.

The attribution data store 108 stores attribution data describing a measure of effectiveness of an advertising target in achieving an advertising goal. For example, if the advertising goal is a certain cost-per-call or a cost-per-conversion value, then the measure of effectiveness may be the number of calls received-per-one-thousand impressions or the number of conversions-per-one-thousand impressions resulting from ad airing to or on the target, respectively. The attribution data store 108 can include attribution data for many different advertising targets and many different measures of effectiveness. Further, the attribution data may be derived from data from a multitude of impressions from numerous different ads and/or different advertisers. For example, the attribution data may include attribution information for advertisements from Advertiser Z for targets A (e.g., a particular television program), B (e.g., 2 PM to 4 PM on Mondays) and C (broadcast network W) during the preceding ten weeks. For target A, the attribution data may describe that ten calls were received per 1000 impressions; for target B, six calls were received per 1000 impressions; and for target C, fourteen calls were received per 1000 impressions, all during the ten week period.

More generally, the attribution data describes the number of events attributable to particular impressions or group(s) of impressions. The events may be, for example, telephone calls, product sales, webpage views, or web search queries. The events may be determined to be attributable to impressions (or ad airings resulting in the impressions) based on the time lapse between the impressions and the occurrences of the events. For example, if an event occurs within fifteen minutes of an impression (e.g., the time/date of the impression can be determined from the impression data stored in the impression data store 106), then the event can be attributed to the impression or group of impressions resulting from an ad airing. However, if the event occurred more than fifteen minutes from the time of the impression then the event may not be attributed to the impression(s). Other time constraints and causal models can also be used.

Events may be determined to be attributable to impressions based on other factors, such as direct consumer input (e.g., a consumer completing a customer survey) or the association between information provided in the advertisement and the event (e.g., a dedicated phone number was provided in the advertisement and the call was received through that phone number or a dedicated URL was provided and there was a direct page view corresponding to the URL). For example, an ad may include a dedicated phone number (e.g., a phone number published only during airings of the ad) by which viewers viewing the ad can call and order products or obtain additional information about the products. If the ad had one thousand impressions from an airing and forty calls were received through the dedicated phone number, then the forty calls would be attributed to those one thousand impressions. Thus, the attribution data would include data specifying that forty calls were attributable to the one thousand impressions from the airing.

The attribution data can be, for example, generated by the television advertisement system 100 or accessed from a third party data provider. In some scenarios, advertisers provide data about the events (e.g., advertiser received 250 calls and/or 120 page views at these times or during these time periods) and the television advertisement system 100 can, for example, map the event information provided by the advertiser to the impression data stored in the impression data store 106 to generate the attribution data.

The television advertisement system 100 also includes an advertisement distribution engine 110, a target bid generation engine 112, and an ad target prediction engine 114. The advertisement distribution engine 110 is configured to provide approved advertisements to the television provider 120. In some implementations, the advertisements are provided to the television provider 120 in advance of airing the advertisements. In some implementations, after receiving a request for any new advertisements to be downloaded for airing by the provider 120, the television advertisement system 100 labels the download with a particular ID that can be used later to identify the advertisement and the distribution engine 110 can deliver the advertisement to the appropriate provider 120.

The ad target prediction engine 114 can, for example, generate an estimated measure of effectiveness of an advertising target. The estimated measure of effectiveness can be tailored to particular advertiser goals. For example, if a particular advertiser has a goal of cost per calls-per-thousand impressions, the ad target prediction engine 114 predicts a calls-per-thousand-impressions metric.

In some implementations, other estimated measures of effectiveness call also be used, for example, conversions-per-thousand-impressions, percent web search query uplift-per-thousand-impressions (e.g., 3% increase in the number of search queries for a product for every thousand impressions) or a specified increase in web traffic.

The target bid generation engine 112 can, for example, generate a target bid for an advertiser to use in an advertisement auction for advertising target. The target bid generation engine 112 receives the predictions from the ad target prediction engine 114 and goal data for an advertiser and generates a target bid. For example, the goal may be a maximum cost-per-thousand-impressions bid (CPM) that is the highest amount that an advertiser is willing to pay for each one thousand impressions of an ad. The target bid represents a predicted cost to the advertiser to achieve the advertiser's advertising goal (e.g., a cost-per-call goal, search query uplift goal, page view uplift goal, etc.) for a target. In some implementations, the target bid generation engine 112 generates the target bid based, in part, on the estimated measure of effectiveness as explained in more detail below.

2.0 Detailed System Operation

Figure 2:
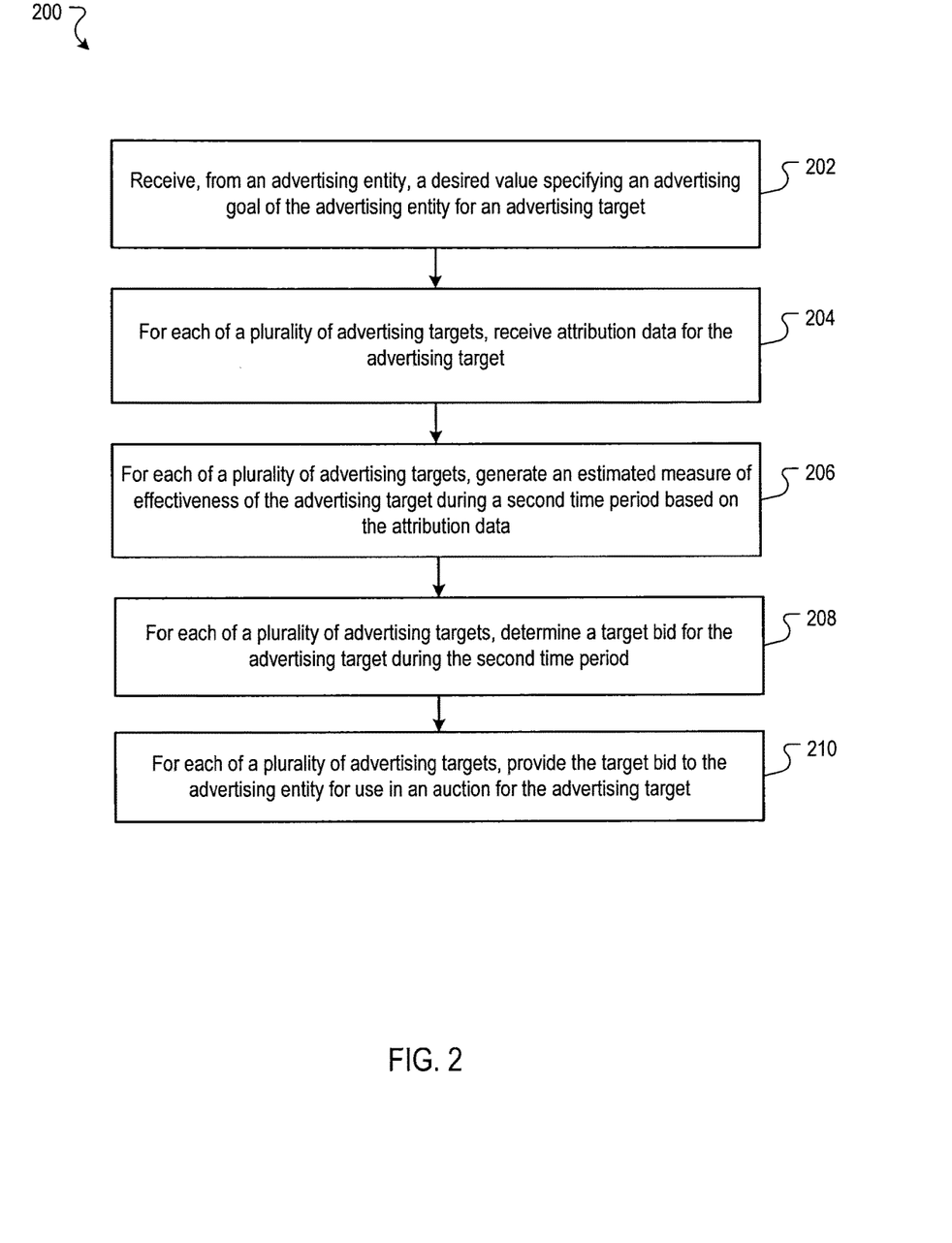
FIG. 2 is a flow diagram of an example' process for providing target bids to advertisers.

One example process by which the television advertisement system 100 provides target bids to advertisers for use in an auction for an advertising target is described with reference to FIG. 2, which is a flow diagram of an example process 200 for providing target bids to advertisers. The process 200 can be implemented in one or more computer devices of the television advertising system 100.

The process 200 receives, from an advertising entity (e.g. advertiser), a value specifying an advertising goal of the advertising entity for an advertising target (202). In some implementations, the target bid generation engine 112 receives the desired value specifying the advertiser's advertising goal. For example, the advertiser's goal may be a cost-per-call goal with a desired value of three dollars per call such that the advertiser is willing to spend three dollars to generate one telephone call from the airing(s) of the ad to the advertising target (e.g., a specific television program). The advertiser may have other advertising goals. For example, the advertiser's goal may be a certain cost-per-conversion goal, an increase in search queries for the advertiser or its products or an increase in web page views of the advertiser's website.

In some implementations, the target bid generation engine 112 receives the advertising goal via an advertiser accessing the television advertising system 100 and electronically submitting the goal to the system 100. In other implementations, the advertiser may submit the bid telephonically or through other means.

The process 200, for each of a plurality of advertising targets, receives attribution data for the advertising target, the attribution data describing a measure of effectiveness of the advertising target in achieving the advertising goal during a first time period (204).

The ad target prediction engine 114 can, for example, receive the advertising target(s) specified by the advertiser, and in response also receive attribution data for the advertising target(s). In some implementations, the ad target prediction engine 114 can receive the attribution data from the attributions data store 108. As described above, the attribution data describe a measure of effectiveness of the advertising target in achieving the advertiser's advertising goal during the first time period (i.e., a past time period). For example, the attribution data may include effectiveness measures such as calls-per-thousand impressions, conversions-per-thousand impressions, and the like, for various advertising targets based on historical performances of the advertising targets (e.g., performances during the last ten weeks). Different targets will likely have different measures of effectiveness based on how many desired events (e.g., calls, conversions, etc.) result from the impressions from the different targets. The targets may have different effectiveness measures based on, for example, different viewership levels, varying demographics associated with the target, etc.

The process 200, for each of a plurality of advertising targets, generates an estimated measure of effectiveness of the advertising target during a second time period based on the attribution data, the second time period being after the first time period (206).

The ad target prediction engine 114 can, for example, generate an estimated measure of effectiveness of the advertising target during a second time period (e.g., a yet-to-occur time period) based on the attribution data. Thus, each advertising target will have an estimated (or predicted) measure of effectiveness based on the past advertising performance of the target as derived from the attribution data for that target. For example, if the target has historically performed well in the past, e.g., the target has received a high number of calls-per thousand impressions during the past two weeks or during the past month, then it is likely that target will also perform well in the near future (e.g., second time period). The second time period can be of equal duration to the first time period or greater or less in duration than the first time period. For example, the second time period can be for one week and the first time period can be ten weeks. In some implementations, an estimated measure of effectiveness of an advertising target will not be generated unless there is sufficient attribution data available for that advertising target. For example, if the effectiveness measure is calls-per-thousand impressions and the attribution data include less than a threshold number of impressions for the target (e.g., twenty thousand impressions) then an estimated measure of effectiveness will not be generated.

The process 200, for each of a plurality of advertising targets, determines a target bid for the advertising target during the second time period based on the desired value and the estimated measure of effectiveness (208). The target bid represents a predicted cost to achieve the advertiser's advertising goal for the target. In some implementations, the target bid is a CPM bid for an auction. For example, if the advertiser places the target bid as the CPM bid for the corresponding target auction and wins the auction, then based on the past performance of the target the advertiser is expected to realize the advertiser's desired goal (e.g., the advertiser will achieve its specific cost-per-call goal).

The target bid generation engine 112 can, for example, determine a target bid for the advertising target during the second time period based on the desired value and the estimated measure of effectiveness. In some implementations, the target bid generation engine 112 can, for example, generate the target bid by multiplying the desired value of the advertising goal by the estimated measure of effectiveness, as shown in Equation 1:

$$\text{Target Bid} = \text{Value of Advertising Goal} * \text{Estimated Measure of Effectiveness} \quad (1)$$

For example, if the value of the advertising goal (or, for convenience, simply the advertising goal) is two dollars per call (as set by the advertiser) and the estimated measure of effectiveness is five calls-per-thousand-impressions then the target bid is ten dollars-per-thousand-impressions (i.e., a $10 CPM bid). By way of another example, if the advertising goal is three dollars per conversion and the estimated measure of effectiveness is two conversions-per-thousand impressions then the target bid is six dollars-per-thousand impressions (i.e., a $6 CPM bid).

The process 200 provides the target bids to the advertising entity for use in an auction for the advertising target (210). For example, the target bid generation engine 112 can provide a target bid to an advertiser for use in a CPM auction for a target (e.g., 2-5 PM on network G). In some implementations, the target bid will not be provided to the advertising entity if the bid has been modified in the past X days (e.g., seven days) to, for example, permit the effects of the last bid change to be reflected in the attribution data before the bid is changed again. In some scenarios, the target bid may need to be adjusted, as explained in more detail below.

2.1 Target Bid Adjustment

In some implementations, the target bid may be adjusted to reduce the disparity between the target bid and the current bid of the advertiser for the target (the current bid is the bid the advertiser most recently used or is still using in the auction for the target). This adjustment allows the advertiser and/or the television advertisement system 100 to incrementally evaluate whether the target bid is driving the advertiser toward its goal for future auctions. Such an incremental evaluation may be prudent given, for example, uncertainties in the past performance of the target (e.g., large fluctuations in the attribution data for the target). For example, in some implementations the target bid for a target may be adjusted according to Equation 2:

$$\text{Adjusted Target Bid} = (\text{Target Bid} + \text{Current Bid})/2 \quad (2)$$

By way of example, if the target bid is an eight dollar CPM bid and the current bid is a four dollar CPM bid then according to Equation 2 the adjusted target bid is a six dollar CPM bid (($8+$4)/2=$6).

Figure 3:
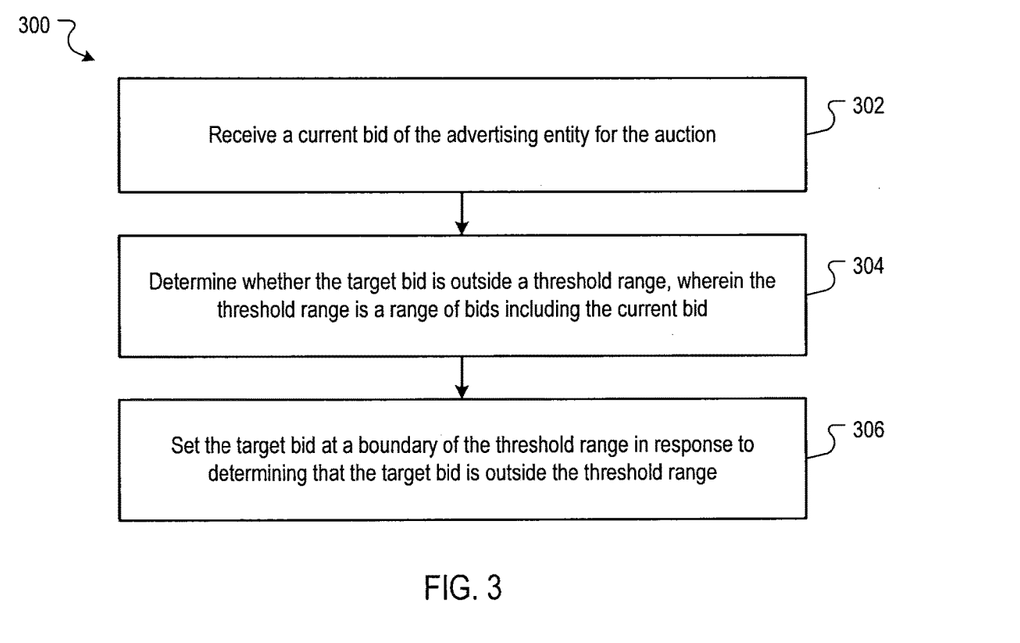
FIG. 3 is a flow diagram of an example process for constraining the target bid.

In some implementations, the target bid may be subject to certain constraints, such as described with reference to FIG. 3, which is a flow diagram of an example process 300 for constraining the target bid. The process 300 can be implemented in the target bid generation engine 112.

The process 300 receives a current bid of the advertising entity for the auction (302). In some implementations, the target bid generation engine 112 receives the current bid of the advertiser from the advertisement distribution engine 110.

The process 300 determines whether the target bid is outside a threshold range (304). The threshold range is a range of bids including the current bid. For example, if the current bid is a five dollar CPM bid then the threshold range can be a range of CPM bids from three dollars to seven dollars. In some implementations, the threshold range can be based on a percent deviation from the current bid. For example, the upper and lower boundaries of the threshold range can be set at "+/−" 50% deviations from the current bid (e.g., if the current bid is six dollars, the threshold range is from nine dollars to three dollars). Other schemes can also be used to set the threshold range. Further, the threshold range does not have to be centered on the current bid (e.g., add X to the current bid to set the upper boundary and subtract Y from the current bid to set the lower boundary).

The process 300 sets the target bid at a boundary of the threshold range in response to determining that the target bid is outside the threshold range (306). For example, if the threshold range is from four to eight dollars and the target bid is nine dollars, the target bid generation engine 112 can set the target bid at the closest threshold range boundary (e.g., eight dollars in this example). Conversely, if the threshold range is from four to eight dollars and the target bid is two dollars the target bid generation engine 112 can set the target at the closest threshold range boundary (e.g., four dollars in this example).

The threshold range helps to prevent anomalies in the attribution data or the advertiser's goal from too drastically affecting the target bid. In some scenarios, it may also be advantageous to ignore the target bid if the target bid is only nominally different from the current bid, as few benefits may be gained by adopting the target bid over the current bid.

In some implementations, the target bid may be subject to constraints in addition to those described with reference to FIG. 3. Examples of these additional constraints are described with reference to FIG. 4, which is a flow diagram of an example process 400 for setting the target bid at the current bid in response to determining that the target bid is within the tolerance range. The process 400 can be implemented in the target bid generation engine 112.

Figure 4:
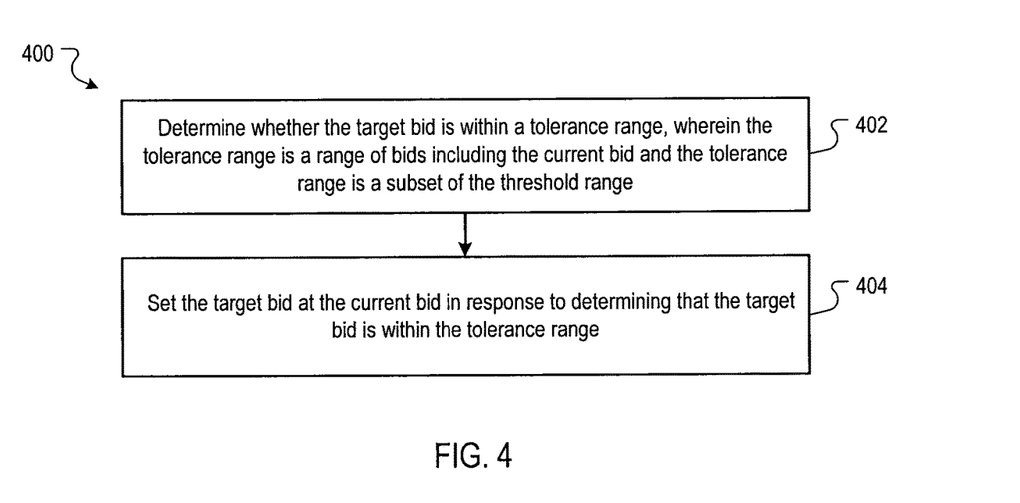
FIG. 4 is a flow diagram of an example process for setting the target bid at the current bid in response to determining that the target bid is within a tolerance range.

The process 400 determines whether the target bid is within a tolerance range (402). The tolerance range is a range of bids that includes the current bid. Additionally, in some implementations, the tolerance range is a subset of the threshold range (i.e., the entirety of the tolerance range does not extend beyond the threshold range). For example, if a current bid is six dollars and a threshold range is from four to eight dollars, then the tolerance range may be from five dollars and fifty cents to six dollars and fifty cents. Like the threshold range, the tolerance range may be based on a percent deviation from the current bid (e.g., +/−5%, provided the tolerance range is a subset of the threshold range). Other schemes for determining the tolerance range may also be used (e.g., add X to the current bid and subtract Y from the current bid). In some implementations, the tolerance range can exceed the threshold range (e.g., the tolerance range can encompass the threshold range).

The process 400 sets the target bid at the current bid in response to determining that the target bid is within the tolerance range (404). For example, if the current bid is six dollars, the target bid is six dollars and twenty-five cents, the threshold range is four to eight dollars, the tolerance range is five dollars and fifty cents to six dollars and fifty cents, then the target bid will be set at the current bid (i.e., the target bid will be set at six dollars) because the target bid is within the tolerance range. Conversely, if the current bid is six dollars, the target bid is seven dollars, the threshold range is four to eight dollars, the tolerance range is five dollars and fifty cents to six dollars and fifty cents, then the target bid will remain at seven dollars as the target bid is not within the tolerance range and is within the threshold range. In some implementations, the target bid generation engine 112 sets the target bid at the current bid in response to determining that the target bid is within the tolerance range.

In some implementations, the target bid is adjusted in accordance with Equation 1 and subject to one or more of the constraints described in processes 300 and 400.

Another factor in determining the target bid for a target is the generation of the estimated measure of effectiveness for that target, which is described in more detail below.

2.2 Estimated Measure of Effectiveness Generation

As described above, the estimated measure of effectiveness of an advertising target is a prediction of how effective the advertising target will be for a future ad campaign (e.g., how many calls-per-thousand-impressions are predicted as a result of airing ads to the advertising target during a yet-to-occur period). Also as described above, the estimated measure of effectiveness can be based on attribution data (e.g., calls-per-thousand-impressions) from past time periods. Given that attribution data from certain time periods (e.g., last week) may be more telling than attribution data from other time periods (e.g., two months ago) with respect to estimating how effective a target will be for a current ad campaign, the attribution data can be partitioned according to when it was generated and weighted to reflect that attribution data from certain time periods (e.g., recent time periods) may be more predictive than attribution data from other time periods (e.g., less recent time periods).

Figure 5:
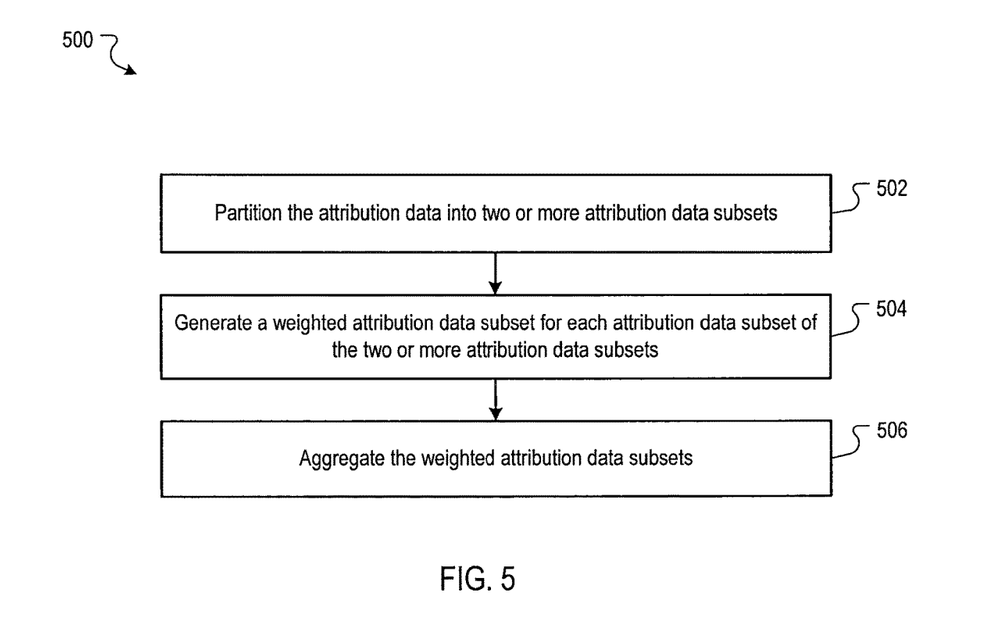
FIG. 5 is a flow diagram of an example process for generating an estimated measure of effectiveness.

The process by which the ad target prediction engine 114 generates the estimated measure of effectiveness of the advertising target in some implementations is explained in more detail with reference to FIG. 5, which is a flow diagram of an example process 500 for generating the estimated measure of effectiveness.

For each target, process 500 partitions the attribution data into two or more attribution data subsets (502). Each of the attribution data subsets uniquely corresponds to one non-overlapping time segment of the non-overlapping time segments in the first time period (i.e., a past time period). For example, the first time period may be the last ten weeks and the attribution data for a given target may be partitioned uniformly into five subsets (subsets 1-5) with each subset corresponding to a two week, non-overlapping time segment in the ten week period (i.e., the non-overlapping time periods would be weeks 1-2, weeks 3-4, weeks 5-6, weeks 7-8 and weeks 9-10; with week 10 being the most recent week and week 1 being the most distant week). Thus, attribution data subset 1 corresponds to weeks 1-2 and includes only attribution data from weeks 1-2; and subset 2 corresponds to weeks 3-4 and includes only attribution data from weeks 3-4; and so on. Thus, attribution data subset 5 includes the most recent attribution data from weeks 9-10. By operation of process 500, the attribution data for each target would be partitioned into attribution data subsets.

Such partitioning results in the attribution data for a particular target being grouped according to the time period during which the underlying event giving rise to the attribution data occurred (e.g., a call was received in week 1 so the attribution data derived from that calling event would also be in the subset corresponding to week 1).

The attribution data does not have to be partitioned into groups that correspond to uniform, non-overlapping time periods—the time periods may be of different durations. For example, once again assuming a ten week first time period and five attribution data subsets, subset 1 may correspond to week 1 and includes only attribution data from week 1, subset 2 may correspond to week 2 and includes only attribution data from week 2, subset 3 may correspond to week 3 and includes only attribution data from week 3, subset 4 may correspond to weeks 4-6 and includes only attribution data from weeks 4-6, and subset 5 may correspond to weeks 7-10 and includes only attribution data from weeks 7-10. By way of another example, the attribution data may be partitioned into two subsets, one corresponding to the first two weeks of the period and the corresponding to all other weeks in the period, regardless of the duration of the time period (e.g., the first time period is six weeks, the first time segment is the two most recent weeks and the second time second is the last four weeks).

Further, the partitioning of the attribution data for different targets can vary and the first time period for the targets can also vary. For example, target A may have a six week time period and two corresponding subsets partitioned such that one subset corresponds to week 6 and the other subset corresponds to weeks 1-5; and target B may have a ten week time period and three corresponding subsets partitioned such that one subset corresponds to weeks 7-10, one subset corresponds to weeks 5-6 and the last subset corresponds to weeks 1-4. In some implementations, the time period may be, for example, a twelve week period with the most recent X days excluded from the time period (e.g., as the attribution data from the most recent X days may be less precise due to not all of the attribution data for that X day period being reported and received).

In some scenarios, a target may only air during certain weeks in the first time period. For example, during an eight week first period, a target may only air during weeks 8, 7, 2 and 1. As such, the attribution data may be partitioned into groups of continuous or near-continuous airings, e.g., one group corresponding to weeks 8 and 7 and the other corresponding to weeks 2 and 1.

In some implementations, the attribution data is partitioned and the time segment durations are selected to provide a desired percentage(s) of impressions (and associated event information) in particular time segments with respect to all impressions in the relevant time period. For example, the time period may be six weeks and 60% of the impressions occurred during the last two weeks (i.e., most recent two weeks) of the six week time period. Accordingly, if the desired percentage for a time segment is 60% then one time segment could be set as the last two weeks of the period, which account for 60% of the impressions, and another time segment could be the last four weeks, which account for the other 40% of impressions.

For clarity, the attribution data can be partitioned into various groups, by factors other than or in addition to time, such as by advertising target, ad, ad campaign, etc., or various combinations thereof. For example, if the attribution data is partitioned according to advertising target (e.g., Wednesday, 5-7 PM, on Broadcast Network Y) then all impressions for that target are grouped together without distinction to, for example, the particular advertisement that was impressed or the advertiser providing the advertisement. By way of another example, the attribution data can be partitioned according to ad campaign and target such that each partition or grouping of the attribution data only includes data for ads of a specific ad campaign of an advertiser that aired for a specific target during a defined time period (e.g., ad A and ad B from advertiser N airing to males in the 18-49 age range during the last two weeks).

To reduce bias or incorrect results in determining target bids due to insufficient attribution data, a minimum number of impressions (and associated event information) for a particular target may be required for the television advertisement system 100 to determine a target bid for that target. For example, the minimum number of impressions for a target during a two week span may be 10,000 impressions or it may be 50,000 impressions during a ten week span. If a target does not have enough impressions to meet the minimum requirement then the television advertisement system 100 may not determine a target bid for that target. The ad target prediction engine 114 can, for example, partition the attribution data into two or more attribution data subsets and determine if a target has satisfied the minimum impressions requirement.

For each target, process 500 generates a weighted attribution data subset for each attribution data subset of the two or more attribution data subsets based on an application of a variable weighting factor to the attribution data subset (504). The variable weighting factor applied to an attribution data subset can vary according to a recency of the non-overlapping time segment corresponding to that attribution data subset.

Because it is likely that data from attribution data subsets corresponding to recent time segments more closely approximate or predict what will occur in a current ad campaign than do attribution data from less recent time segments, in some implementations, the attribution data subsets from recent time segments can be given more weight than attribution data subsets from less recent time segments. For example, the highest weight of the weighting factor is applied to the attribution data subset corresponding to the time segment most recent in time and the lowest weight of the weighting factor is applied to the attribution data subset corresponding to the time segment most distant in time. Thus, attribution data subsets from recent time segments are more heavily weighted than attribution data subsets from less recent time segments.

For each target, process 500 aggregates the weighted attribution data subsets (506). As the various attribution data subsets have been weighted according to the time segment to which they correspond, the attribution data subsets can be aggregated so that the attribution data from the entire first time period is reflected in the estimated measure of effectiveness. In some implementations, the result from aggregating the weighted attribution data subsets is, in fact, the estimated measure of effectiveness for the target.

Thus, the estimated measure of effectiveness can be, for example, generated according to Equation 3:

$$\text{Aggregated } AD = \left( \sum_{x=0\_to\_t-2} \alpha [AD_{t-x} * (1-\alpha)^x] \right) + (1-\alpha)^{t-1} AD_1 \quad (3)$$

where:
Aggregated AD is the aggregation of the weighted attribution data subsets for a target during the first time period;
$\alpha$ is a smoothing factor;
t is the number of non-overlapping time segments; and
$AD_{t-x}$ is the attribution data subset corresponding to non-overlapping time segment t-x, with $AD_t$ being the attribution data subset corresponding to the most recently occurring non-overlapping time segment and $AD_1$ being the attribution data subset corresponding to non-overlapping time segment most distant in time.

An example of the estimated measure of effectiveness as determined by Equation 3 is described with reference to Table 1:

TABLE 1

| Weeks | 8-7 (July 15-July 2) | 6-3 (July 1-June 11) | 2-1 (June 10-May-28) |
|---|---|---|---|
| Calls | 6 | 10 | 5 |
| Impressions | 2000 | 2500 | 1250 |
| Calls-per-thousand-impressions | 3 | 4 | 4 |

Table 1 illustrates, for example, that for a particular target (e.g., television program Y), over an eight week time period, there were 2000 impressions that resulted in six calls, 2500 impressions that resulted in ten calls, and 1250 impressions that resulted in five calls during weeks 8-7, 6-3 and 2-1, respectively. Accordingly, if the estimated measure of effectiveness is the Aggregated AD then, for example, according to Equation 3 and Table 1, and assuming $\alpha=0.6$, the estimated measure of effectiveness is 3.4 calls-per-thousand-impressions, e.g., $(0.6*3)+(0.6*0.4*4)+(0.4*0.4*4)=3.4$.

The smoothing factor $\alpha$ can be determined, for example, empirically. As discussed above, other measures of effectiveness can also be estimated by using Equation 3, for example, conversion rates, web page view rates or search query rates.

The data from Table 1 can be, for example, derived from the attribution data stored in the attribution data store 108. Also, smoothing algorithms (other than Equation 3) can be used to aggregate the partitioned attribution data.

In some implementations, the attribution data subset from the most recent two week period is weighted more heavily than attribution data subset(s) from all other time periods.

In some implementations, the weighting factor does not have to be greater for attribution data from recent time periods. Rather, the weighting factor can vary according to, for example, a confidence that the attribution data from a certain time period will accurately predict how well the target will perform in the current ad campaign. For example, it may be the case that three months ago the advertising environment for a target more closely matches the current advertising environment than does the advertising environment from last week (e.g., three months ago the advertising target, Wednesdays from 7 PM-9 PM on broadcast network Y, included a national sports event and the same target for next week will also include a national sporting event where the target last week did not include such an event). Thus, the attribution data from three months ago may be more heavily weighted than the attribution data from last week even though last week's attribution data is from a more recent time period.

Once the estimated measure of effectiveness has been generated for a target and the advertiser's advertising goal for that target is known, the target bid for that advertising target can be generated and, in some cases, adjusted with reference to Sections 3.0 and 4.0.

3.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 6:
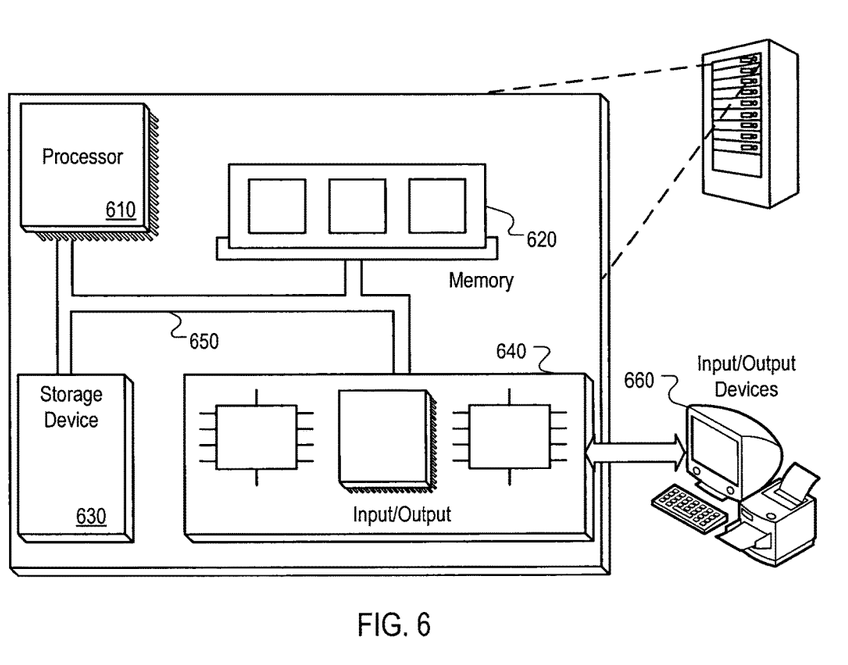
FIG. 6 is a block diagram of a programmable processing system.

An example of one such type of computer is shown in FIG. 6, which shows a block diagram of a programmable processing system (system). The system 600 that can be utilized to implement the systems and methods described herein. The architecture of the system 600 can, for example, be used to implement a computer client, a computer server, or some other computer device.

The system 600 includes a processor 610, a memory 620, a storage device 630, and an input/output device 640. Each of the components 610, 620, 630, and 640 can, for example, be interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can, for example, include a hard disk device, an optical disk device, or some other large capacity storage device.

The input/output device 640 provides input/output operations for the system 600. In one implementation, the input/output device 640 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 660.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed on a processor, comprising:
  receiving, by the processor, from an advertising entity, a desired value specifying an advertising goal of the advertising entity for an advertising target, wherein advertisements of the advertising entity are presented to the advertising targets; and
  for each of a plurality of advertising targets:
    receiving attribution data for the advertising target, the attribution data describing a measure of effectiveness of the advertising target in achieving the advertising goal during a first time period;
    generating an estimated measure of effectiveness of the advertising target during a second time period based on the attribution data, wherein the second time period is after the first time period; and
    automatically determining, by the processor, a target bid for the advertising target during the second time period based on the desired value and the estimated measure of effectiveness, the automatically determined target bid representing a predicted cost to achieve the advertising goal of the advertising entity for the advertisement target;

preventing, by the processor, anomalies in the attribution data from causing greater than a threshold change from a current bid for the advertising target to the automatically determined target bid for the advertising target by:
   determining that the automatically determined target bid is outside of a threshold range of bids, wherein the threshold range of bids is based on the current bid and includes the current bid; and
   adjusting the automatically determined target bid to match a boundary of the threshold range of bids in response to determining that the automatically determined target bid is outside of the threshold range of bids, the adjusting comprising:
      for one or more increments:
         determining an incremental bid that is a value between the current bid and the boundary of the threshold range of bids;
         using the incremental bid to distribute advertisements of the advertising entity to the advertising target; and
         evaluating performance of the incremental bid in reaching the advertising goal of the advertising entity for the advertising target;
      based on the performance of at least one incremental bid being different than the advertising goal of the advertising entity for the advertising target, adjusting the target bid to match the boundary of the threshold range of bids; and
      using the adjusted target bid to distribute the advertisements of the advertising entity to the advertising target.

2. The computer-implemented method of claim 1, wherein the advertising goal is a goal to achieve a specified cost-per-call resulting from a presentation of an advertisement to the advertising target.

3. The computer-implemented method of claim 2, wherein the estimated measure of effectiveness of the advertising target is a number of calls-per-one-thousand advertisement impressions to the advertising target.

4. The computer-implemented method of claim 1, wherein the advertising goal is a goal to achieve a specified cost-per-conversion resulting from a presentation of an advertisement to the advertising target.

5. The computer-implemented method of claim 1, wherein the advertising goal is a goal to achieve a specified search query uplift resulting from a presentation of an advertisement to the advertising target.

6. The computer-implemented method of claim 1, wherein generating an estimated measure of effectiveness of the advertising target comprises:
   partitioning the attribution data into two or more attribution data subsets, wherein each of the attribution data subsets uniquely corresponds to one non-overlapping time segment of a plurality of non-overlapping time segments in the first time period;
   generating a weighted attribution data subset for each attribution data subset of the two or more attribution data subsets based on an application of a variable weighting factor to the attribution data subset, wherein the variable weighting factor applied to an attribution data subset varies according to a recency of the non-overlapping time segment corresponding to that attribution data subset; and
   aggregating the weighted attribution data subsets.

7. The computer-implemented method of claim 6, wherein a highest weight of the variable weighting factor is applied to an attribution data subset corresponding to a non-overlapping time segment most recent in time and a lowest weight of the variable weighting factor is applied to an attribution data subset corresponding to a non-overlapping time segment most distant in time.

8. The computer-implemented method of claim 6, wherein the plurality of non-overlapping time segments in the first time period are a first non-overlapping time segment and a second non-overlapping time segment, the first non-overlapping time segment being a most-recent two week period in the first time period and the second non-overlapping time segment being all other time in the first time period.

9. The computer-implemented method of claim 6, wherein determining a target bid for the advertising target during the second time period comprises multiplying the desired value by the estimated measure of effectiveness.

10. The computer-implemented method of claim 1, wherein the attribution data is based on past performance of advertisements from the advertising entity.

11. The computer-implemented method of claim 1, wherein the attribution data is based on past performance of advertisements from the advertising entity and other advertising entities.

12. The computer-implemented method of claim 1, further comprising:
   determining whether the target bid is within a tolerance range, wherein the tolerance range is a range of bids including the current bid and the tolerance range is a subset of the threshold range of bids; and
   setting the target bid at the current bid whenever the target bid is within the tolerance range.

13. The computer-implemented method of claim 1, wherein the advertising goal is a goal to achieve a specified increase in web traffic resulting from a presentation of an advertisement to the advertising target.

14. A system, comprising:
   a data processing apparatus; and
   software stored on a computer storage apparatus and comprising instructions executable by the data processing apparatus and upon such execution cause the data processing apparatus to perform operations comprising:
   receiving, from an advertising entity, a desired value specifying an advertising goal of the advertising entity for an advertising target, the advertising target pertaining to a category of television advertisement, wherein advertisements of the advertising entity are presented to the advertising targets; and
   for each of a plurality of advertising targets:
      receiving attribution data for the advertising target, the attribution data describing a measure of effectiveness of the advertising target in achieving the advertising goal during a first time period;
      generating an estimated measure of effectiveness of the advertising target during a second time period based on the attribution data, wherein the second time period is after the first time period; and
      automatically determining a target bid for the advertising target during the second time period based on the desired value and the estimated measure of effectiveness, the target bid representing a predicted cost to achieve the advertising goal of the advertising entity for the advertisement target;
      preventing anomalies in the attribution data from causing greater than a threshold change from a current bid for the advertising target to the automatically determined target bid for the advertising target by:
  determining that the automatically determined target bid is outside of a threshold range of bids, wherein the threshold range of bids is based on the current bid and includes the current bid; and
  adjusting the automatically determined target bid to match a boundary of the threshold range of bids in response to determining that the automatically determined target bid is outside of the threshold range of bids, the adjusting comprising:
    for one or more increments:
      determining an incremental bid that is a value between the current bid and the boundary of the threshold range of bids;
      using the incremental bid to distribute advertisements of the advertising entity to the advertising target; and
      evaluating performance of the incremental bid in reaching the advertising goal of the advertising entity for the advertising target;
    based on the performance of at least one incremental bid being different than the advertising goal of the advertising entity for the advertising target, adjusting the target bid to match the boundary of the threshold range of bids; and
  using the adjusted target bid to distribute the advertisements of the advertising entity to the advertising target.

15. The system of claim 14, wherein the advertising goal is a goal to achieve a specified cost-per-call resulting from a presentation of an advertisement to the advertising target.

16. The system of claim 14, wherein generating an estimated measure of effectiveness of the advertising target comprises:
  partitioning the attribution data into two or more attribution data subsets, wherein each of the attribution data subsets uniquely corresponds to one non-overlapping time segment of a plurality of non-overlapping time segments in the first time period;
  generating a weighted attribution data subset for each attribution data subset of the two or more attribution data subsets based on an application of a variable weighting factor to the attribution data subset, wherein the variable weighting factor applied to an attribution data subset varies according to a recency of the non-overlapping time segment corresponding to that attribution data subset; and
  aggregating the weighted attribution data subsets.

17. The system of claim 14, wherein the operations further comprise:
  determining whether the target bid is within a tolerance range, wherein the tolerance range is a range of bids including the current bid and the tolerance range is a subset of the threshold range; and
  setting the target bid at the current bid whenever the target bid is within the tolerance range.

18. A non-transitory computer storage medium encoded with a computer program, the program comprising instructions that when executed by a data processing apparatus causes the data processing apparatus to perform operations, comprising:
  receiving, by the data processing apparatus, from an advertising entity, a desired value specifying an advertising goal of the advertising entity for an advertising target, the advertising target pertaining to a category of television advertisement, wherein advertisements of the advertising entity are presented to the advertising targets; and
  for each of a plurality of advertising targets:
    receiving attribution data for the advertising target, the attribution data describing a measure of effectiveness of the advertising target in achieving the advertising goal during a first time period;
    generating an estimated measure of effectiveness of the advertising target during a second time period based on the attribution data, wherein the second time period is after the first time period; and
    automatically determining, by the data processing apparatus, a target bid for the advertising target during the second time period based on the desired value and the estimated measure of effectiveness, the automatically determined target bid representing a predicted cost to achieve the advertising goal of the advertising entity for the advertisement target;
    preventing, by the data processing apparatus, anomalies in the attribution data from causing greater than a threshold change from a current bid for the advertising target to the automatically determined target bid for the advertising target by:
      determining that the automatically determined target bid is outside of a threshold range of bids, wherein the threshold range of bids is based on the current bid and includes the current bid; and
      adjusting the automatically determined target bid to match a boundary of the threshold range of bids in response to determining that the automatically determined target bid is outside of the threshold range of bids, the adjusting comprising:
        for one or more increments:
          determining an incremental bid that is a value between the current bid and the boundary of the threshold range of bids;
          using the incremental bid to distribute advertisements of the advertising entity to the advertising target; and
          evaluating performance of the incremental bid in reaching the advertising goal of the advertising entity for the advertising target;
        based on the performance of at least one incremental bid being different than the advertising goal of the advertising entity for the advertising target, adjusting the target bid to match the boundary of the threshold range of bids; and
      using the adjusted target bid to distribute the advertisements of the advertising entity to the advertising target.

19. The computer storage medium of claim 18, wherein the advertising goal is a goal to achieve a specified cost-per-call resulting from a presentation of an advertisement to the advertising target.

* * * * *